Figures 1, 2, 3, 4:
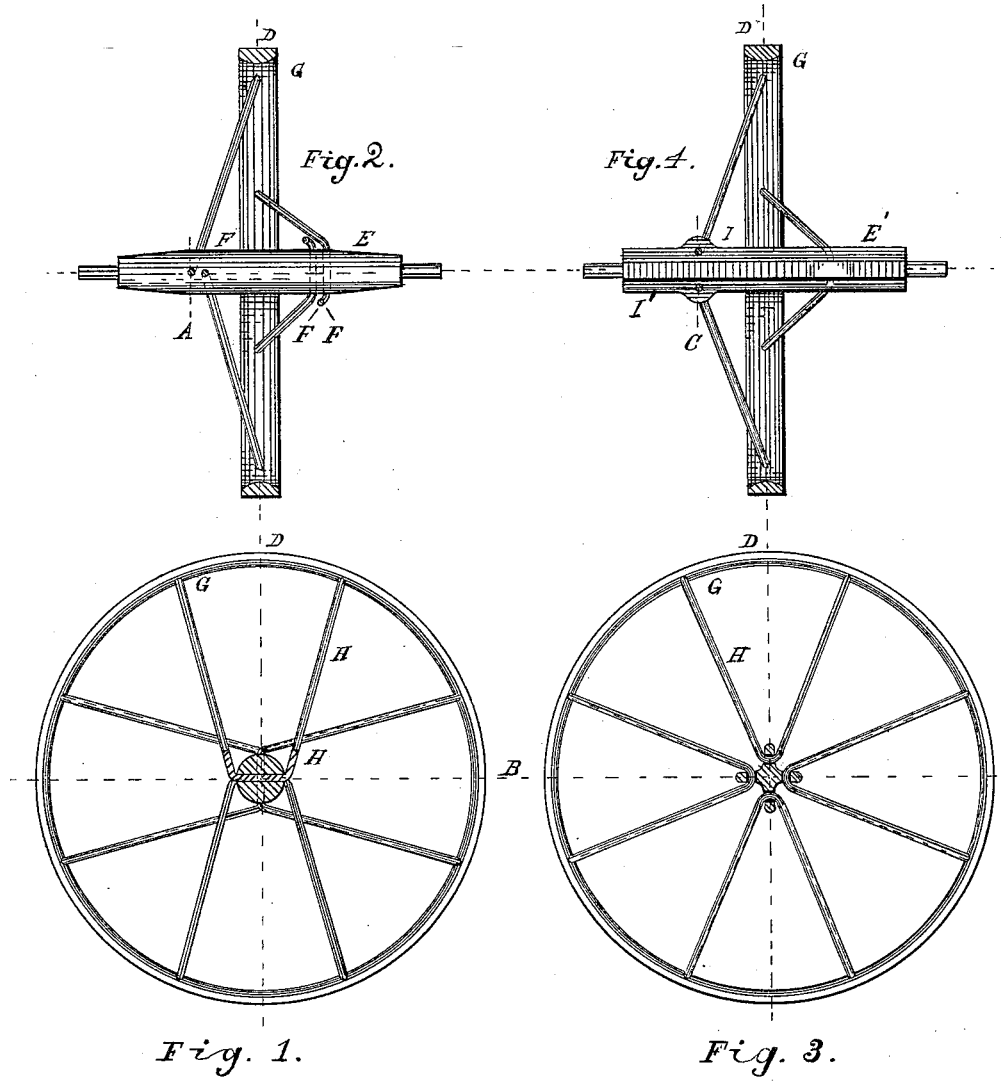

(No Model.)

G. W. THOMAS.
WHEELBARROW WHEEL.

No. 339,712. Patented Apr. 13, 1886.

Witnesses: Inventor

United States Patent Office.

GEORGE W. THOMAS, OF TOLEDO, OHIO.

WHEELBARROW-WHEEL.

SPECIFICATION forming part of Letters Patent No. 339,712, dated April 13, 1886.

Application filed January 23, 1886. Serial No. 189,485. (No model.)

*To all whom it may concern:*

Be it known that I, GEORGE W. THOMAS, a citizen of the United States, residing at Toledo, in the county of Lucas and State of Ohio, have invented a new and useful Improvement in Wheelbarrow-Wheels, of which the following if a specification.

My invention relates to improvements in wheelbarrow-wheels, whereby a more cheap, simple, and durable and a hubless wheel is produced. I attain these objects by the mechanism illustrated in the accompanying drawings, in which—

Figure 1 is a side view on line A, Fig. 2. Fig. 2 is a vertical part section on line B, Fig. 1. Fig. 3 is a side view of the same wheel, having a somewhat different form of axle, on line C, Fig. 4. Fig. 4 is a vertical part sec tion on line B, Fig. 3.

Similar letters refer to similar parts through the several views.

In the several figures, D represents a metallic rim, which is made in one continuous piece.

The axle E, on account of cheapness, is preferably made of round bar-iron; but this may also be made in the form of a winged shaft without changing the nature of my invention, and cast, rolled, or by any suitable process formed into the desired shape.

In Figs. 1 and 2 I have illustrated my improved wheel with the circular form of axle. This axle is perforated diametrically, as shown at F, said perforations being equal in number to one-half the number of spokes desired in the wheel. These holes lie in different vertical planes, as shown at F' F'. The rim D is also perforated, as shown at G, said perforations corresponding in number with the number of spokes desired in the wheel. The spokes H are made two of one piece of material, and passed through the perforations F of the axle E and bent closely upon the said axle, as shown at H', Fig. 1. The ends of the spokes H are then passed through the perforations G in the rim D and fastened by riveting or otherwise.

In Figs. 3 and 4 I have illustrated my improved wheel with the winged form of shaft or axle before mentioned. This axle has lugs I, formed upon and constituting a part of the winged ribs I'. These lugs I are perforated for the reception of the bent spokes H, before mentioned, the ends of which spokes are attached to the rim D, as hereinbefore described.

To give extra rigidity to the wheel, the spokes H are set bracing with respect to the rim D and axle E E', as shown in Figs. 2 and 4.

To give the required strength or beauty, any desired number of pairs of spokes may be placed in this wheel.

This form of mechanism is simple, durable, and cheap, and exceedingly strong, and admirably adapted to the use for which it is intended, and is a great improvement in wheelbarrows.

I am aware that prior to my invention wheelbarrow-wheels having bended arms which were made in pairs and attached to metallic rims by riveting or otherwise, and which arms were attached to their axles in various ways, have been known and used. In some the last-named attachments were made through intervening wooden or metallic hubs of various styles, in others by the said arms or spokes being bent around the outer surfaces of their axles, and in others by a part of the spokes on either side being welded together and drawn out on said either side, forming axle-journals. I therefore do not claim such combinations, broadly; but What I do claim, and desire to secure by Letters Patent, is—

A vehicle-wheel having rim D, metallic spokes H, each rod forming two spokes, and combined with shaft E, and having or not having on said shaft E the ribs I' or lugs I, when the said spokes pass through perforations in the material of the shaft, which perforations are made and which spokes pass at or approximately at right angles to the axial line of the said shaft, substantially as shown and described.

GEO. W. THOMAS.

Witnesses:
LESLIE H. COLBURN,
H. J. COLBURN.